United States Patent
Tessarolo

(10) Patent No.: US 6,243,731 B1
(45) Date of Patent: Jun. 5, 2001

(54) APPARATUS AND METHOD FOR EXTENDING REGISTER DYNAMIC RANGE

(75) Inventor: Alexander Tessarolo, Sydney (AU)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/223,390

(22) Filed: Dec. 30, 1998

Related U.S. Application Data

(60) Provisional application No. 60/078,737, filed on Mar. 20, 1998.

(51) Int. Cl.[7] ............................................. G06F 7/00
(52) U.S. Cl. ................................... 708/498; 708/525
(58) Field of Search ..................... 708/495, 496, 708/497, 498, 499, 500, 501, 502, 503, 504, 505, 518, 525, 623; 341/155; 340/825.5; 711/214

(56) References Cited

U.S. PATENT DOCUMENTS

| | | | | |
|---|---|---|---|---|
| 4,825,400 | * | 4/1989 | Simoncic et al. | 708/505 |
| 5,408,427 | * | 4/1995 | Einaj et al. | 708/505 |
| 5,450,553 | * | 9/1995 | Kitagaki et al. | 711/214 |
| 5,550,767 | * | 8/1996 | Taborn et al. | 364/748.04 |
| 5,553,015 | * | 9/1996 | Elliott et al. | 364/748.04 |
| 5,675,339 | * | 10/1997 | Andren et al. | 341/155 |
| 5,684,728 | * | 11/1997 | Okayama et al. | 708/525 |
| 5,710,549 | * | 1/1998 | Horst et al. | 340/825.5 |
| 6,037,947 | * | 3/2000 | Nelson et al. | 345/426 |
| 6,148,309 | * | 11/2000 | Azagury et al. | 707/206 |

* cited by examiner

Primary Examiner—Christopher B. Shin
(74) Attorney, Agent, or Firm—W. Daniel Swayze, Jr.; Wade James Brady, III; Frederick J. Telecky, Jr.

(57) ABSTRACT

An apparatus for extending register dynamic range on a processor is disclosed. The apparatus comprises a register (102) for performing a set of processor (100) operations. The apparatus further comprises a counter (104) on the processor (100) having a value. During the set of operations, the processor (100) increments the value when positive overflow occurs on the register (102) and decrements the value when negative overflow occurs on the register (102). Upon completion of the set of operations, the processor (100) saturates the register (102) with a positive value when the value is greater than zero, and with a negative value when the value is less than zero. Further, a method for extending register dynamic range on a processor is disclosed. The method comprises performing a set of processor (100) operations in a register (102). The method further comprises incrementing a value in counter (104) during the set of operations when positive overflow occurs on the register (102). The method further comprises decrementing the value in the counter (104) when negative overflow occurs on the register (102) during the set of operations. When the set of operations is complete, the method further comprises saturating the register (102) with a positive value if the value is greater than zero, and saturating the register (102) with a negative value when the value is less than zero. If the value is equal to zero, the register (102) is not saturated. The method further comprises setting the value to zero in the counter (104).

16 Claims, 2 Drawing Sheets

APPARATUS AND METHOD FOR EXTENDING REGISTER DYNAMIC RANGE

This application claims benefit to U.S. provisional application Ser. No. 60/078,737 filed Mar. 20, 1998.

TECHNICAL FIELD OF THE INVENTION

The present invention relates in general to processors and, more particularly, to an apparatus and method for extending register dynamic range on a processor.

BACKGROUND OF THE INVENTION

Data operations on processors may be performed with the use of registers, data buses and memory arrays. Most processors may have one or more registers called accumulators. An accumulator register may be where the arithmetic and logic operations are performed for the processor. Data may be taken from memory in the processor and stored into the accumulator register. Operations may be performed with the contents of the accumulator, such as ADD and SUBTRACT commands. After these operations, the results may be stored in the accumulator. The contents of the memory register remain unchanged.

In many controlled algorithms, such as state estimators and Kalman filters, accumulative results in the accumulator register may exceed the range of the register, resulting in register overflow. For example, a 32-bit accumulator register may have a result that exceeds the most positive or the most negative value of the 32-bit register. To accommodate these overflows, the register may be extended beyond its current bit size to extend its dynamic range. However, instructions and code written for the original bit size of the accumulator register would not be compatible with this new dynamic range. The same numerical operations are not maintained, and the effects on the carry and overflow flags for the register are different in the extended case. Floating point operations may be implemented instead of physically extending the range of the register, but these operations also require more instructions and software code. Further, the above solutions all require more silicon and higher costs to implement on a processor.

SUMMARY OF THE INVENTION

From the foregoing, it may be appreciated that a need has arisen for a method for extending register dynamic range on a processor without requiring more silicon or increasing costs. In accordance with the present invention, an apparatus and method for extending register dynamic range on a processor is provided that substantially eliminates or reduces the disadvantages and problems associated with conventional register operations.

An apparatus for extending register dynamic range on a processor is disclosed. The apparatus has a register for performing a set of processor operations and a counter with a predetermined value. During the set of operations, the counter is incremented when positive overflow occurs on the register and decremented when negative overflow occurs on the register. Upon completion of the set of operations, a logic unit saturates the register with a positive value when the value is greater than zero, and with a negative value when the value is less than zero. If the value is zero, the register is not saturated.

In another embodiment, a method for extending register dynamic range in accordance with the present invention comprises five steps. The first step comprises initializing a predetermined value in a counter on the processor. The second step comprises performing a set of processor operations on a register. The third step comprises incrementing the counter when positive overflow occurs on the register during the set of operations. The fourth step comprises decrementing the counter when negative overflow occurs on the register during the set of operations. The fifth step comprises, when the set of operations is complete, saturating the register with a positive value if the value is greater than zero, and saturating the register with a negative value when the value is less than zero, and setting the value to zero in the counter.

A technical advantage of the present invention is that a method for extending register dynamic range on a processor is provided. Another technical advantage is that the detectable range of a register is extended, while maintaining compatibility with existing devices. Another technical advantage is that the detectable range of a register is extended with minimal use of silicon and reduced software code.

BRIEF DESCRIPTION OF THE DRAWINGS

For a more complete understanding of the present invention and its advantages thereof, reference is now made to the following description taken in conjunction with the accompanying drawings, wherein like reference numerals represent like parts, in which.

DETAILED DESCRIPTION OF THE INVENTION

Figure 1:
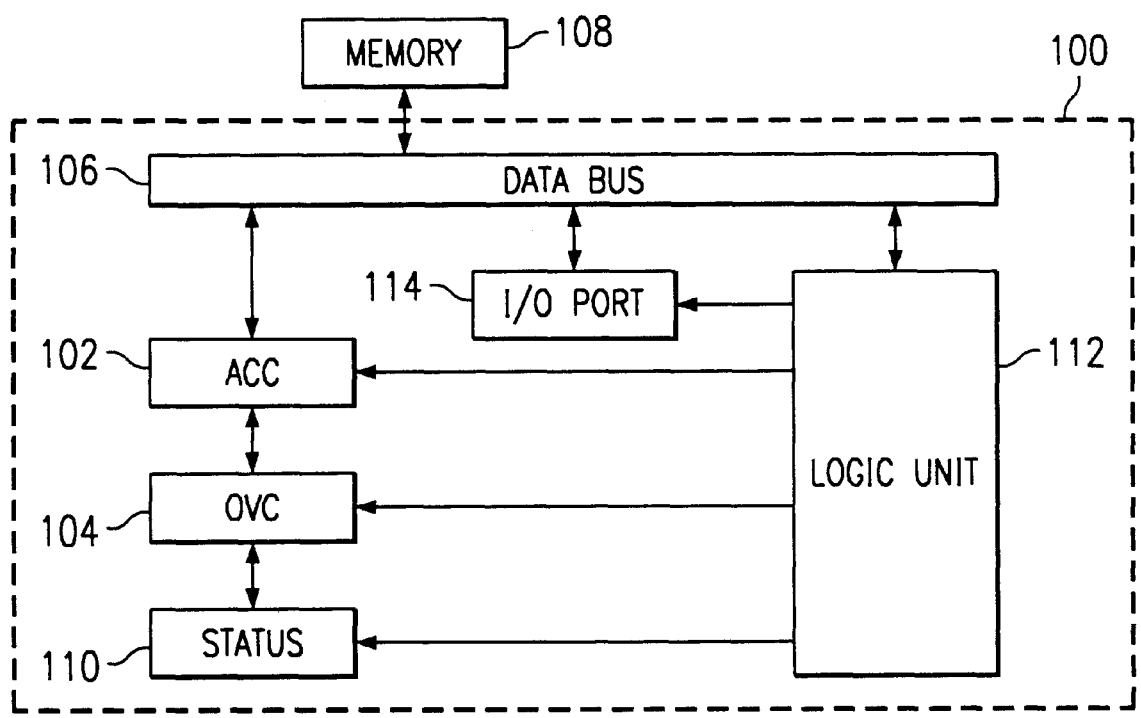
FIG. 1, illustrates a block diagram of a processor for use in accordance with one embodiment of the present invention.
Figure 2:
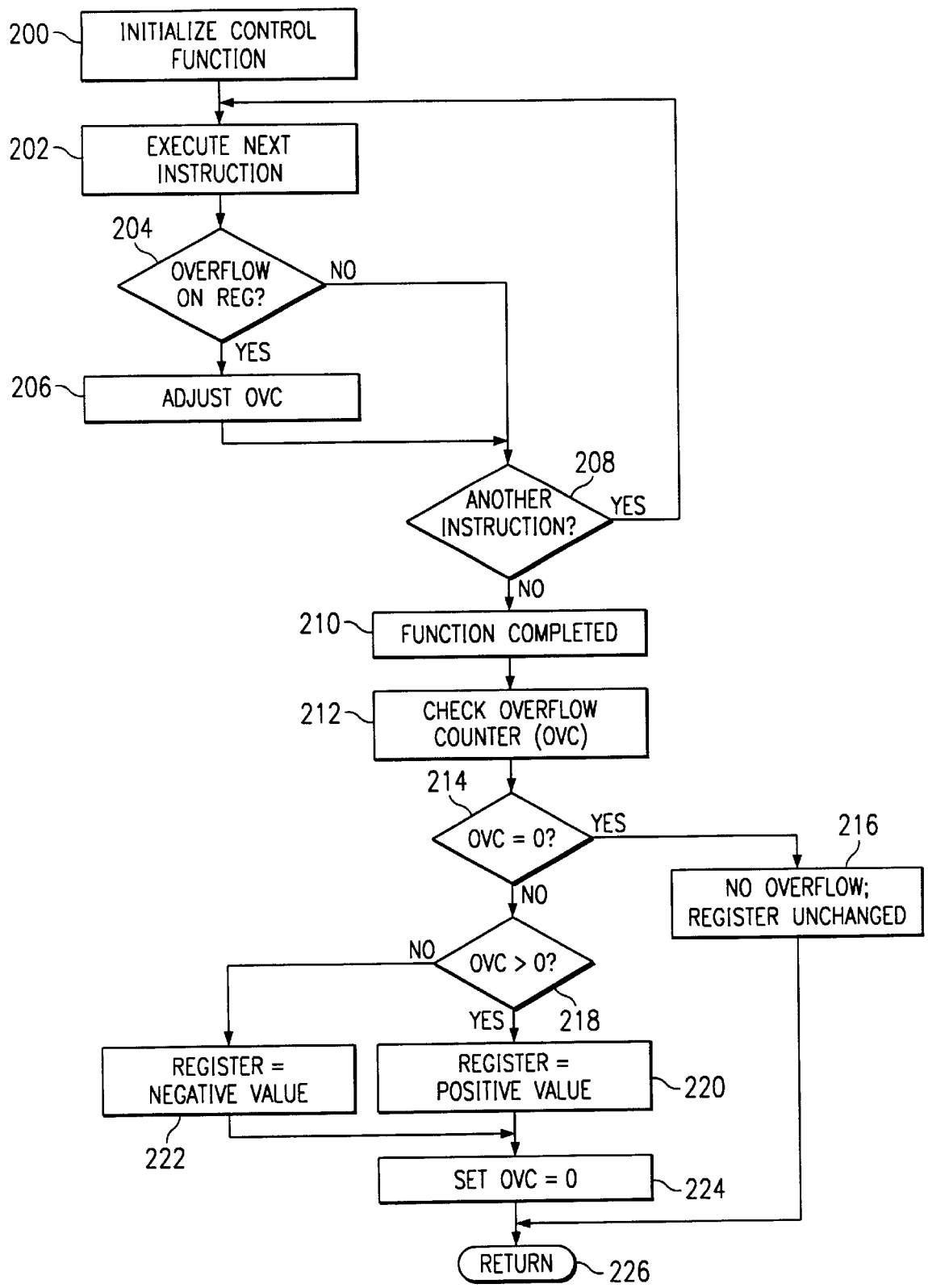
FIG. 2, illustrates a flowchart of a method for extending dynamic range of a register in accordance with one embodiment of the present invention.

An embodiment of the present invention and its advantages are best understood by referring now in more detail to FIGS. 1 and 2 of the drawings, in which like numerals refer to like parts. FIGS. 1 and 2 illustrate an apparatus and method for extending registered dynamic range on a processor in accordance with one embodiment of the present invention.

FIG. 1 illustrates a processor 100. Processor 100 may be a 16-bit addressable machine that can perform 32-bit read and write operations to memory. Processor 100 also may have a plurality of registers, such as register 102, for performing arithmetic and logic operations. In an embodiment, register 102 is an accumulator register, which is able to perform instructions or operations, such as, but not limited to, add, subtract or complement. Processor 100 also has an overflow counter 104. Overflow counter 104 is incremented or decremented by processor 100 whenever positive or negative overflow is detected on accumulator register 102. Status register 110 may save the value of overflow counter 104. Thus, the value of overflow counter 104 may be retained, and restored, during interrupt events. Processor 100 also has a data bus 106 and a memory 108. Data bus 106 allows data to be loaded and stored from memory 108.

Data bus 106 also allows the contents of accumulator register 102 to be stored to memory 108. Data bus 106 also allows data to be moved between accumulator register 102 and an input/output port 114 on processor 100. In an embodiment, these contents may be final results of an algorithm, such as a control function, and read from processor 100, and other processes known to those skilled in the art.

Logic unit 112 may execute instructions for processor 100 and give commands to other components on processor 100, such as accumulator register 102, overflow counter 104, input/output port 114 and status register 110. For example, these instructions may modify the contents of accumulator register 102, and other commands known by those skilled in the art. Logic unit 112 may have the instructions wired on processor 100. In an embodiment, logic unit 112 modifies the contents of accumulator register 102 in response to instructions executed by processor 100.

As operations are performed by processor 100, accumulator register 102 may have results that overflow. Overflow occurs when data in accumulator register 102 exceeds the register size. This overflow may be positive or negative. A positive overflow occurs when the value in accumulator register 102 exceeds the maximum positive value allowed by the register's bit size. A negative overflow occurs when the value in accumulator register 102 exceeds the maximum negative value allowed by the register's bit size. In an embodiment, accumulator register 102 is a 32-bit register and the maximum positive value possible is 7FFF FFFF, and the maximum negative value possible is 8000 0000. Both of these values are shown in hexadecimal format. Any values not within this range may not be stored in accumulator register 102.

An overflow counter 104 is responsive to accumulator register 102 and may be incremented or decremented by processor 100 whenever positive or negative overflow occurs. The value in overflow counter 104 indicates if the final result of the operations is within the range of the accumulator register 102. A value that is above zero indicates that the final result exceeded the positive limit of accumulator register 102. In an embodiment, this value is 7FFF FFFF. A value that is below zero indicates that the final result exceeded the negative limit of accumulator register 102. In an embodiment, this value is 8000 0000.

Referring to FIG. 2, a method for extending register dynamic range on processor 100 in accordance with the present invention is disclosed. In an embodiment, the value of overflow counter 104 determines whether accumulator register 102 is saturated with a positive value, negative value, or not at all. In Step 200, processor 100 is initialized to perform a set of operations. The operations may be an algorithm, such as, but not limited to, a control function. Further, the set of operations may be add and subtract commands, and such operations as those known to one skilled in the art. Further, overflow counter 104 may be set to a predetermined value prior to any operations being performed, or any instructions executed, by processor 100. In an embodiment, this predetermined value is zero. A predetermined value of zero indicates no overflow conditions exist on accumulator register 102.

In Step 202, an instruction is executed as part of the operations being run by processor 100. The instruction in Step 202 may be an add or subtract command on an accumulator register 102, or other operations known to those skilled in the art. After the instruction is completed, Step 204 is executed by determining whether overflow occurred on accumulator register 102. As mentioned above, accumulator register 102 overflows when the contents of accumulator register 102 exceed the positive maximum or negative maximum values of the register. If an overflow occurred in Step 204, Step 206 is executed. Step 206 adjusts overflow counter 104. If a positive overflow occurred, overflow counter 104 is incremented. In an embodiment, the value of overflow counter 104 is increased by 1. Alternatively, the value in overflow counter 104 may be adjusted to the actual value of the overflow from accumulator register 102. If negative overflow occurred, then overflow counter 104 is decremented. The value in overflow counter 104 may be decremented by 1, or, alternatively, by the overflow amount on accumulator register 102. In an embodiment, positive overflow occurs when a positive result exceeds the maximum positive value of accumulator register 102. Further, negative overflow occurs when a negative result exceeds the maximum negative value of the accumulator register 102.

Referring back to Step 204, if no overflow occurred on accumulator register 102 during Step 202, overflow counter 104 is not adjusted and Step 208 is executed by determining whether further instructions are to be executed in the set of operations on processor 100. If further instructions are to be executed, Step 208 refers back to Step 202 for further determinations of overflow in accumulator register 102. If no more instructions are to be executed, then Step 210 is executed. Step 210 indicates the function, or set of operations, has been completed with no further adjustments to overflow counter 104.

After the operations have been completed, Step 212 is executed and the value of overflow counter 104 is checked. In Step 214, a determination is made whether the value is equal to zero. If the value is zero, no overflow occurred at the completion of operations on accumulator register 102. Thus, accumulator register 102 is not saturated and its contents are not changed, as disclosed in Step 216.

In Step 214, if the value is not equal to zero, then Step 218 is executed. Step 218 determines whether the value in overflow counter 104 is greater than zero. If the value is greater than zero, then positive overflow occurred at the completion of the operations in Step 210, and Step 220 is executed. In Step 220, accumulator register 102 is saturated with a positive value. The positive value is the maximum positive number allowed by accumulator register 102, and is dependent upon its bit-size. Logic unit 112 saturates accumulator register 102 by modifying the contents in accumulator register 102 to the positive value. In an embodiment, accumulator register 102 may have its contents overwritten by the positive value, which is equal to 7FFF FFFF. Thus, the positive value saturates the contents in accumulator register 102 to a hexadecimal value of 7FFF FFFF.

Step 222 is executed when the value is less than zero in Step 218. If the value is less than zero in Step 218, then negative overflow occurred at the end of processor operations in Step 210. In Step 222, logic unit 112 saturates accumulator register 102 with a negative value. The negative value is the maximum negative number allowed by accumulator register 102, and is dependent upon its bit-size. In an embodiment, accumulator register 102 has a negative value of 8000 0000, which overwrites the contents in accumulator register 102. Thus, logic unit 112 saturates the contents in accumulator register 102 to a hexadecimal value of 8000 0000. Step 224 sets overflow counter 104 equal to zero, which indicates the overflow issue has been resolved. Step 226 exits the method.

The size of overflow counter 104 may be dependent on the dynamic range of the operations performed on processor 100. In an embodiment, a 6-bit overflow counter 104 offers the dynamic range equivalent to a 38-bit register for a 32-bit accumulator register 102. Further, the 32-bit accumulator register 102 is compatible with other 32-bit devices, and able to perform operations that require the range of a 32-bit register. Further, there are no adverse effects on the carry and the overflow flags of accumulator register 102.

By performing the saturations, processor 100 ensures that the value in accumulator register 102 is compatible with the requirements of processor 100. The register operations that occur during overflow, such as a carry, will not corrupt the final result.

Status register 110 on processor 100 may be utilized to retain the value in overflow counter 104 during an interrupt, which may occur while operations are being performed in Steps 200–210. With status register 110, the value in overflow counter 104 is saved with status register 110 during the interrupt and restored after the interrupt is completed.

Thus, it is apparent that there has been provided, in accordance with the present invention, an apparatus and method for extending register dynamic range on an processor that satisfies the advantages set forth above. Although the present invention has been described in detail, it should be understood that various changes, substitutions, and alterations may be made herein. For example, although the registers were described as being 32-bit registers, the bit size of the registers may be different than those disclosed, and the values used to saturate the registers may be different than those disclosed. Other examples, are readily ascertainable by one skilled in the art and can be made without departing from the spirit and the scope of the present invention as defined by the following claims.

What is claimed is:

1. A method for extending register dynamic range on a processor, the method comprising:
   initializing a predetermined value in a counter;
   performing a set of processor operations in a register;
   incrementing the counter when positive overflow occurs in the register during the set of operations;
   decrementing the counter when negative overflow occurs in the register during the set of operations; and
   when the set of operations is complete, saturating the register with a positive value when the value is greater than zero, and saturating the register with a negative value when the value is less than zero, and setting the value to zero in the counter.

2. The method of claim 1, further comprising:
   storing the value from the counter to a memory and loading the value from the memory to the counter.

3. The method of claim 1, wherein the register is a 32-bit register.

4. The method of claim 1, wherein the value is stored in a status register when an interrupt occurs on the processor.

5. The method of claim 1, wherein the set of processor operations include add and subtract operations.

6. A method for extending register dynamic range on a processor, the method comprising:
   performing a set of add and subtract operations in a register;
   incrementing a value in a counter when positive overflow occurs in the register during the set of operations;
   decrementing the value in the counter when negative overflow occurs in the register during the set of operations;
   determining the value after completion of the set of operations; and
   saturating the register with a positive value when the value is greater than zero, and with a negative value when the value is less than zero, and not saturating the register when the value is equal to zero.

7. The method of claim 6, wherein the saturating step further comprises setting the value equal to zero after the register has been saturated.

8. The method of claim 6, further comprising:
   storing the value in a status register during an interrupt on the processor.

9. An apparatus for extending register dynamic range on a processor, comprising:
   a register for performing a set of processor operations;
   a counter having a predetermined value and responsive to the register, for incrementing the counter when positive overflow occurs in the register, and decrementing the counter when negative overflow occurs in the register during the set of operations; and
   a logic unit for saturating the register with a positive value when the value is greater than zero, and with a negative value when the value is less than zero upon completion of the set of operations.

10. The apparatus of claim 9, further comprising:
    the processor storing the value in a memory, and loading the value from the memory to the counter.

11. The apparatus of claim 9, further comprising:
    a status register, wherein the value is saved on the status register during an interrupt on the processor.

12. The apparatus of claim 9, wherein the register is a 32-bit register.

13. The apparatus of claim 9, wherein the counter is a 6-bit counter.

14. The apparatus of claim 9, wherein the processor sets the value to zero after the register has been saturated.

15. The apparatus of claim 9, wherein the processor operations are add and subtract operations on the register.

16. The apparatus of claim 9, wherein the processor does not saturate the register when the value is zero after completion of the set of operations.

* * * * *